United States Patent
Shirakawa et al.

(10) Patent No.: US 12,516,962 B2
(45) Date of Patent: Jan. 6, 2026

(54) POSITION DETECTION DEVICE

(71) Applicant: Proterial, Ltd., Tokyo (JP)

(72) Inventors: Yohei Shirakawa, Tokyo (JP); Yuta Sugiyama, Tokyo (JP); Naoki Futakuchi, Tokyo (JP); Yukio Ikeda, Tokyo (JP); Yujiro Tomita, Tokyo (JP)

(73) Assignee: Proterial, Ltd., Tokyo (JP)

( * ) Notice: Subject to any disclaimer, the term of this patent is extended or adjusted under 35 U.S.C. 154(b) by 170 days.

(21) Appl. No.: 18/420,840

(22) Filed: Jan. 24, 2024

(65) Prior Publication Data

US 2024/0255317 A1 Aug. 1, 2024

(30) Foreign Application Priority Data

Jan. 27, 2023 (JP) .................. 2023-010654

(51) Int. Cl.
*G01D 5/20* (2006.01)

(52) U.S. Cl.
CPC ....... *G01D 5/2053* (2013.01); *G01D 2205/10* (2021.05)

(58) Field of Classification Search
CPC .... G01D 5/145; G01D 5/2053; G01D 5/2046; G01D 2205/10; G01D 2205/18; B62D 15/0225; B62D 15/02; G05D 1/2437; G01R 33/091
See application file for complete search history.

(56) References Cited

U.S. PATENT DOCUMENTS

| | | |
|---|---|---|
| 11,608,106 B2 | 3/2023 | Nakamura et al. |
| 2020/0361523 A1 | 11/2020 | Nakamura et al. |
| 2023/0251112 A1* | 8/2023 | Shirakawa ......... B62D 15/0225 324/207.16 |
| 2023/0384124 A1* | 11/2023 | Shirakawa ......... B62D 15/0225 |

FOREIGN PATENT DOCUMENTS

JP 2020-185921 A 11/2020

* cited by examiner

*Primary Examiner* — Eman A Alkafawi
*Assistant Examiner* — Suresh K Rajaputra
(74) *Attorney, Agent, or Firm* — Studebaker Brackett PLLC

(57) ABSTRACT

A position detection device for detecting a position of a shaft moving forward and backward in an axial direction is provided with a detection object mounted on the shaft, a substrate disposed to face the detection object, an excitation coil that is mounted on the substrate and generates an AC magnetic field, a detection coil that is mounted on the substrate and arranged along the axial direction of the shaft and configured so that a magnitude of a voltage induced varies with a position of the detection object, and a sensor for detecting a physical quantity used to correct the position of the shaft by using a sensor coil configured by the excitation coil, the detection coil, or an other coil provided on the substrate.

6 Claims, 12 Drawing Sheets

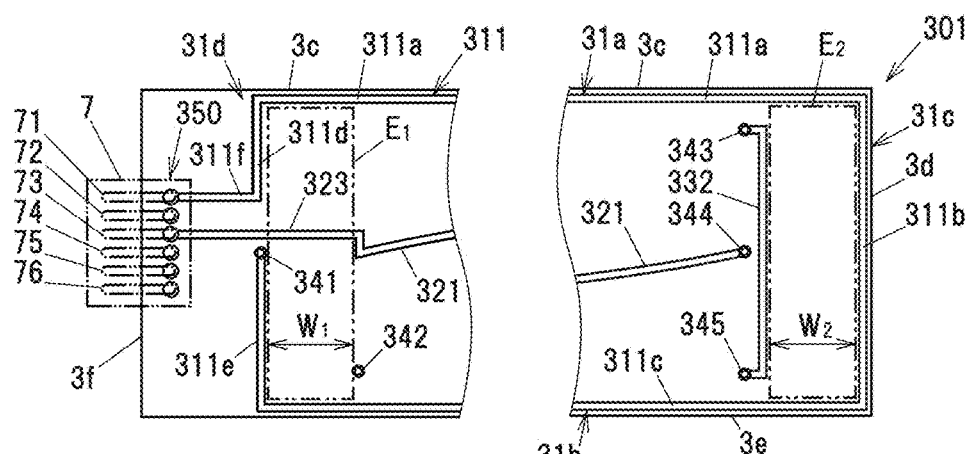
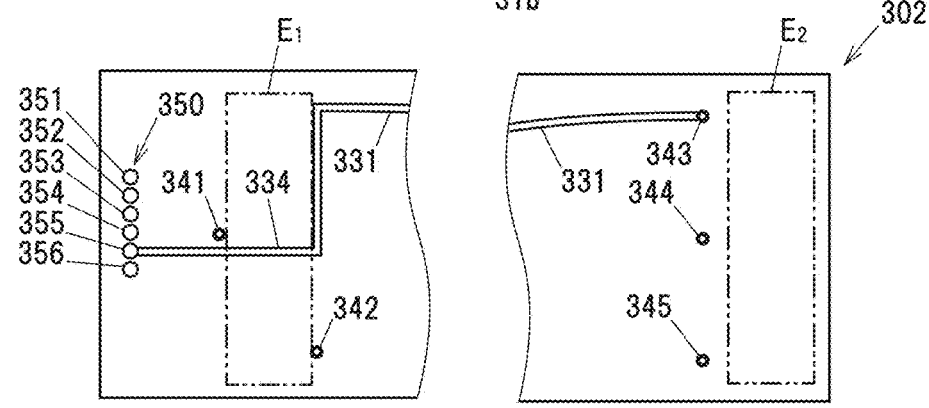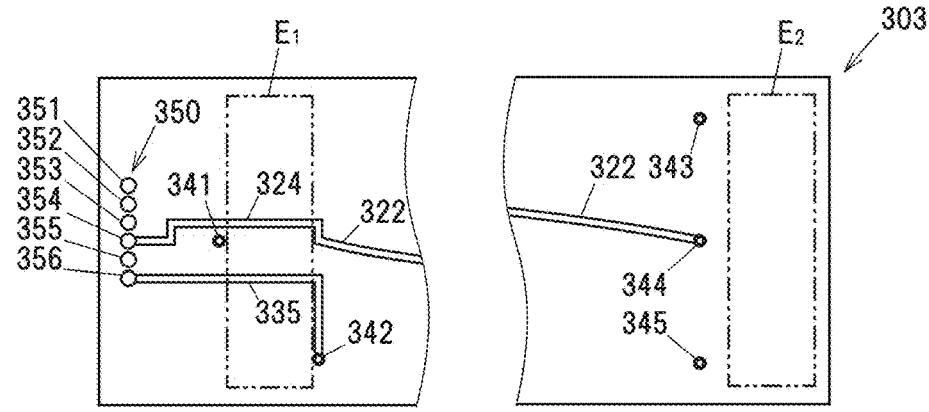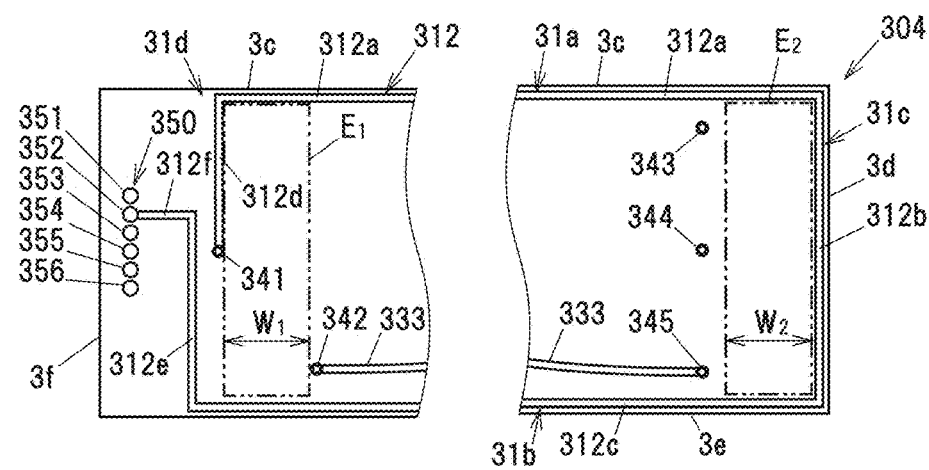

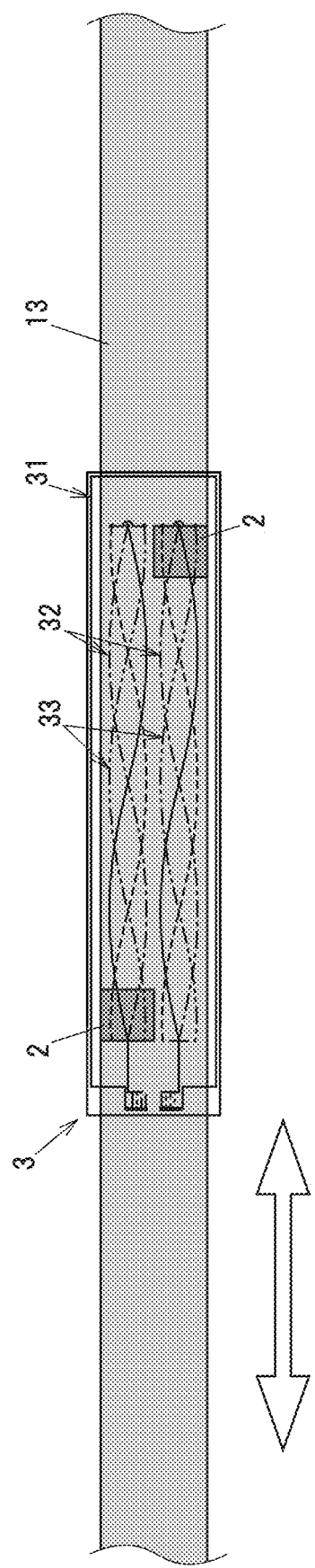

POSITION DETECTION DEVICE

CROSS-REFERENCE TO RELATED APPLICATIONS

The present patent application claims the priority of Japanese patent application No. 2023-010654 filed on Jan. 27, 2023, and the entire contents thereof are hereby incorporated by reference.

TECHNICAL FIELD

The present invention relates to a position detection device that detects the position of a shaft that moves forward and backward in an axial direction.

BACKGROUND OF THE INVENTION

A so-called "Steer-by-wire" mechanism is increasingly being applied to automobiles. Unlike conventional steering mechanisms, the "steer-by-wire" mechanism does not have a mechanical connection between steerable wheels and a steering mechanism, but connects therebetween electrically. Therefore, this mechanism has the advantages of greater freedom in the design of the vehicle interior and the possibility of reducing the weight of the steering mechanism. On the other hand, this mechanism has a feature that the steerable wheels are not directly subjected to road reaction forces from the wheels. Therefore, it is believed that the "steer-by-wire" mechanism will be applied to automobiles in the future, as it is compatible with the automation of automobile driving that is under development.

Conventionally, a position detection device for detecting displacement of a shaft (rack shaft) that determines the steering angle is known (see, for example, Patent Literature 1).

Citation List Patent Literature 1: JP2020-185921A

SUMMARY OF THE INVENTION

By the way, for driving automation, it is necessary to replace the detailed steering and steering rotation that has been performed by the driver with an automobile system. Therefore, high-accuracy control is required to steer the wheels, and it is desirable to acquire the steering angle with high accuracy. Therefore, a position detecting device that can acquire the position of the shaft (rack shaft) that determines the steering angle with high accuracy is desired.

Therefore, it is an object of the invention to provide a position detection device capable of detecting the position of a shaft that moves axially forward and backward with high accuracy.

To solve the problems mentioned above, the present invention provides: a position detection device for detecting a position of a shaft moving forward and backward in an axial direction, comprising:

a detection object mounted on the shaft;

a substrate disposed to face the detection object;

an excitation coil that is mounted on the substrate and generates an AC magnetic field;

a detection coil that is mounted on the substrate and arranged along the axial direction of the shaft and configured so that a magnitude of a voltage induced varies with a position of the detection object; and a sensor for detecting a physical quantity used to correct the position of the shaft by using a sensor coil configured by the excitation coil, the detection coil, or an other coil provided on the substrate.

Effects of the Invention

According to the present invention, it is possible to provide a position detection device capable of detecting the position of a shaft that moves axially forward and backward with high accuracy.

BRIEF DESCRIPTION OF DRAWINGS

FIGS. 5A to 5D are plan views showing enlarged views of the first to fourth metal layers at both ends of the substrate in the longitudinal direction viewed from the front surface side.

FIG. 13 is an explanatory diagram of a sensor in the fourth example.

DETAILED DESCRIPTION OF THE INVENTION

Embodiment

Next, an embodiment of the present invention will be described with reference to appended drawings.

Figure 1A:
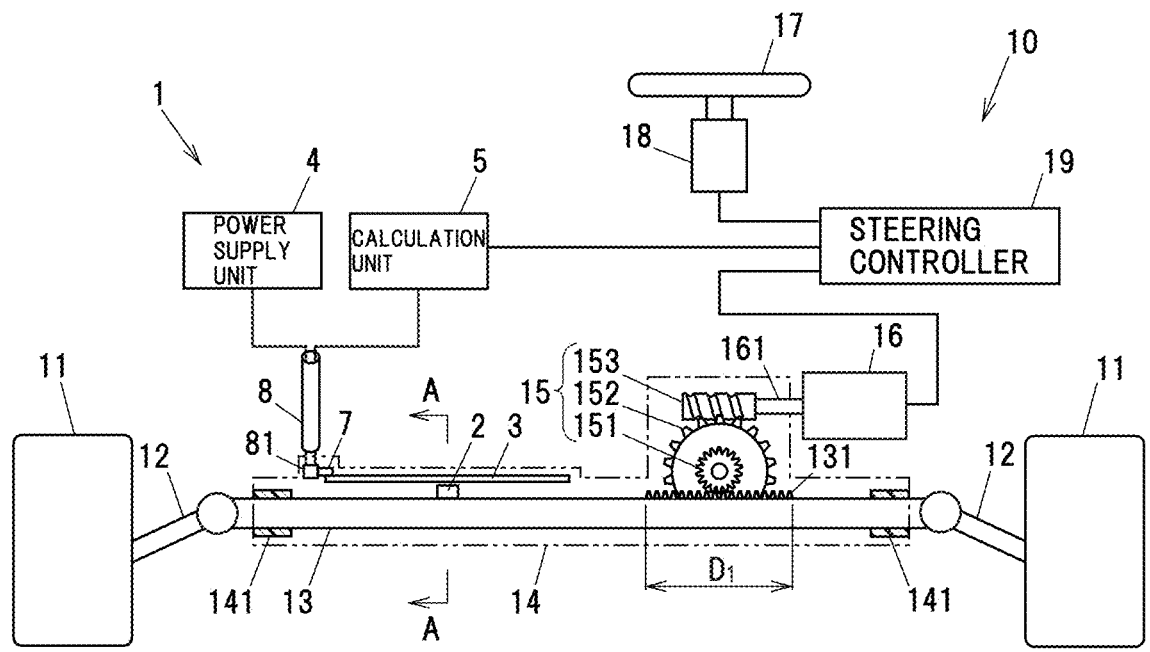
FIG. 1A is a schematic diagram of a vehicle equipped with a steer-by-wire steering device having a stroke sensor as a position detection device, according to an embodiment of the present invention.
Figure 1B:
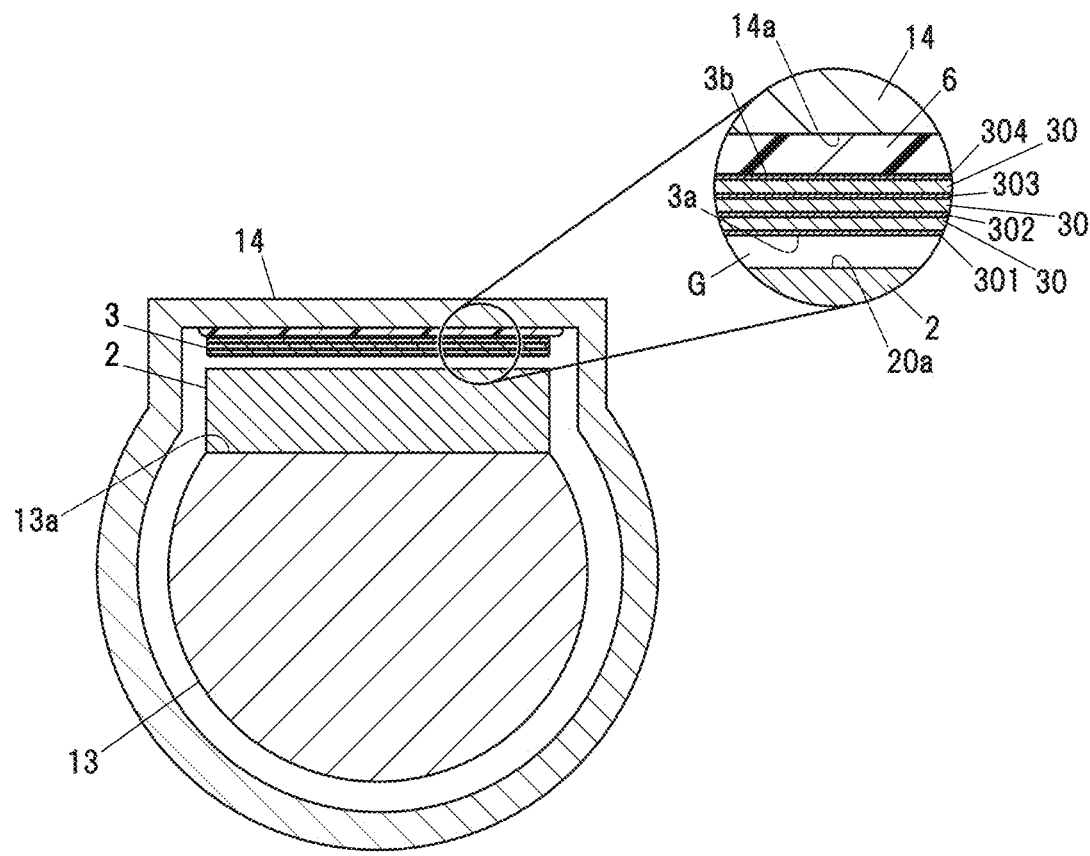
FIG. 1B is a cross-sectional view taken along line A-A of FIG. 1A.

FIG. 1A is a schematic diagram of a vehicle equipped with a steer-by-wire steering device 10 having a stroke sensor 1 as a position detection device according to an embodiment of the present invention. FIG. 1B is a cross-sectional view taken along line A-A of FIG. 1A.

As shown in FIG. 1A, the steering device 10 comprises a stroke sensor 1, tie rods 12 connected to steerable wheels 11 (left and right front wheels), a rack shaft 13 connected to the tie rods 12, a cylindrical housing 14 for accommodating the rack shaft 13, a worm reduction mechanism 15 having a pinion gear 151 meshed with a rack teeth 131 of the rack shaft 13, an electric motor 16 that imparts axial movement force to the rack shaft 13 via the worm reduction mechanism 15, a steering wheel 17 to be operated by the driver, a steering angle sensor 18 for detecting a steering angle of the steering wheel 17, and a steering controller 19 for controlling the electric motor 16 based on the steering angle detected by the steering angle sensor 18.

In FIG. 1A, the housing 14 is shown in a virtual line (phantom). The rack shaft 13 is made of a steel material such as carbon steel, and supported by a pair of rack bushings 141 attached to both ends of the housing 14. The worm reduction mechanism 15 has a worm wheel 152 and a worm gear 153, and the pinion gear 151 is attached to the worm wheel 152. The worm gear 153 is attached to a motor shaft 161 of the electric motor 16.

The electric motor 16 generates torque by a motor current supplied from the steering controller 19 and rotates the worm wheel 152 and the pinion gear 151 via the worm gear 153. When the pinion gear 151 rotates, the rack shaft 13 moves forward and backward in its axial direction, and the left and right steerable wheels 11 are steered. The rack shaft 13 can move rightward and leftward in a vehicle width direction within a predetermined range from a neutral position when the steering angle is zero. In FIG. 1A, a double arrow indicates a range DI where the rack shaft 13 can move in the axial direction.

(Structure of Stroke Sensor 1)

The stroke sensor 1 includes a target 2 attached to the rack shaft 13, a substrate 3 arranged to face the target 2, a power supply unit 4, and a calculation unit 5. The substrate 3 is secured inside the housing 14. The stroke sensor 1 detects the position of the rack shaft 13 with respect to the housing 14 based on the position of the target 2 and outputs information on the detected position to the steering controller 19. The steering controller 19 controls the electric motor 16 in such a manner that the position of the rack shaft 13 detected by the stroke sensor 1 corresponds to the steering angle of the steering wheel 17 detected by the steering angle sensor 18.

Figure 2:
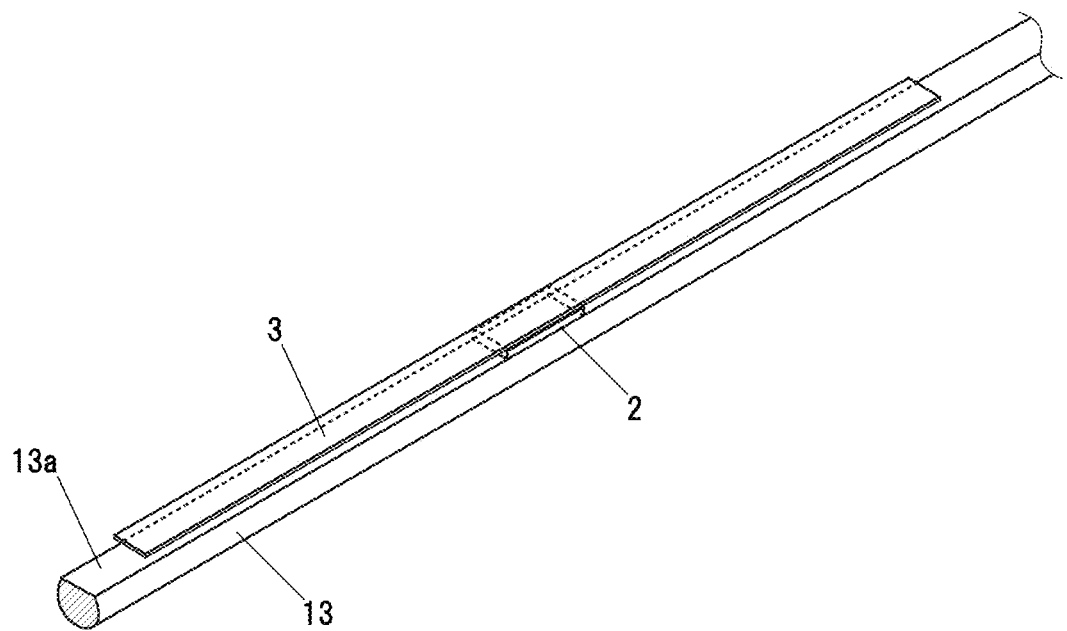
FIG. 2 is a perspective view showing a target and a substrate together with a part of the rack shaft.

FIG. 2 is a cross-sectional view of the target 2 and the substrate 3 together with a part of the rack shaft 13. Target 2 is formed in a rectangular parallelepiped (cuboid) shape which is long in the axial direction of the rack shaft 13. The rack shaft 13 has a flat-shaped facing surface 13a facing the substrate 3, and the target 2 is fixed to the facing surface 13a by means of fixing, for example, adhesion or welding. The substrate 3 is rectangular in shape with the axial direction of the rack shaft 13 being the longitudinal direction, and is arranged parallel to the facing surface 13a of the rack shaft 13 and perpendicular to the radial direction of the rack shaft 13.

The target 2 is a mode of a detection object and is a target for detecting the position of the rack shaft 13. The target 2 is made of a material whose magnetic permeability is equal to or higher than that of the rack shaft 13, or whose electrical conductivity is equal to or higher than that of the rack shaft 13. When a material with a magnetic permeability equal to or higher than the rack shaft 13 is used for the target 2, a magnetic material such as ferrite can be used as the material. When a material with electrical conductivity equal to or higher than that of the rack shaft 13 is used for the target 2, the material can be, for example, a metal mainly composed of iron, aluminum, or copper.

In the present embodiment, the target 2 is provided in such a manner that it protrudes from the facing surface 13a formed on the rack shaft 13 toward the substrate 3. Therefore, even if a material with the same magnetic permeability as the rack shaft 13 or a material with the same electrical conductivity as the rack shaft 13 is used as the material of the target 2, the functions and effects described below can be achieved. However, in order to increase the accuracy of position detection, it is desirable to use a high permeability material with a higher magnetic permeability than the material of the rack shaft 13 or a high conductivity material with a higher conductivity than the material of rack shaft 13 as the material of target 2.

As shown in FIG. 1B, the substrate 3 is a four-layered substrate in which layers of a plate-shaped base material 30 made of a dielectric material such as FR4 (glass fiber impregnated with epoxy resin and heat-cured) are provided between the first to fourth metal layers 301 to 304. The front surface 3a on a first metal layer 301-side of the substrate 3 faces a facing surface 13a of the rack shaft 13 and the target 2. A back surface 3b on a fourth metal layer 304-side of the substrate 3 is secured to an inner surface 14a of the housing 14 by an adhesive 6. The thickness of each base material 30 is, e.g., 0.3 mm. Each of the first to fourth metal layers 301 to 304 has a thickness of, e.g., 18 μm.

The housing 14 is made of a non-magnetic metal, such as a die-cast aluminum alloy. The housing 14 in the portion to which the substrate 3 is attached may be made of a resin material. The target 2 is rectangular parallelpide (cuboid) in shape and a facing surface 20a with the substrate 3 is planar. The facing surface 20a of the target 2 faces parallel to the front surface 3a of the substrate 3 via an air gap G. A width of the air gap G in the direction perpendicular to the front surface 3a of the substrate 3 is 10 mm or less, e.g., 1 mm. A thickness of the target 2 is, e.g., 5 mm.

Figure 3:
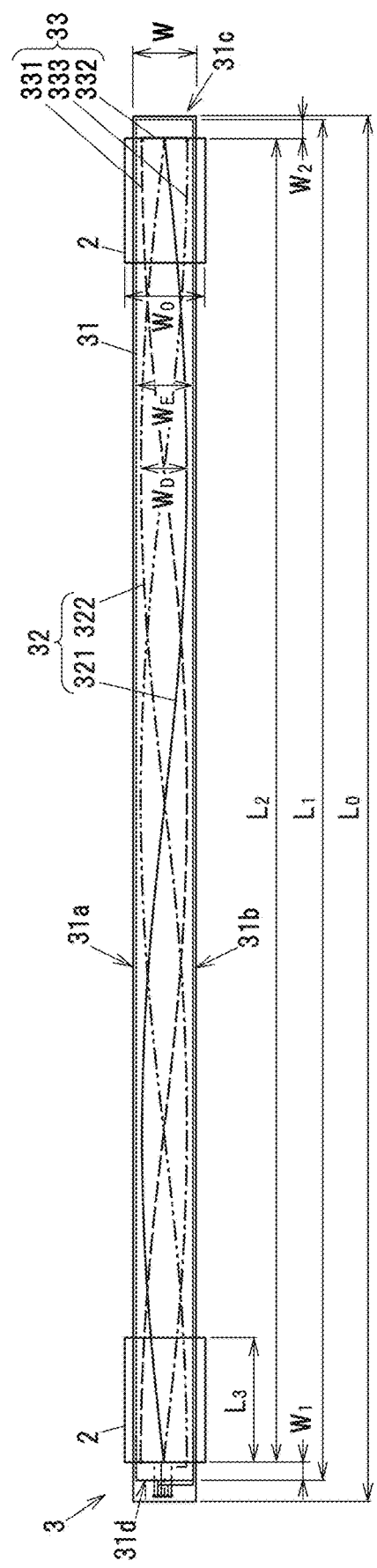
FIG. 3 is a plan view of the substrate viewed from a front surface side.
Figure 4A:
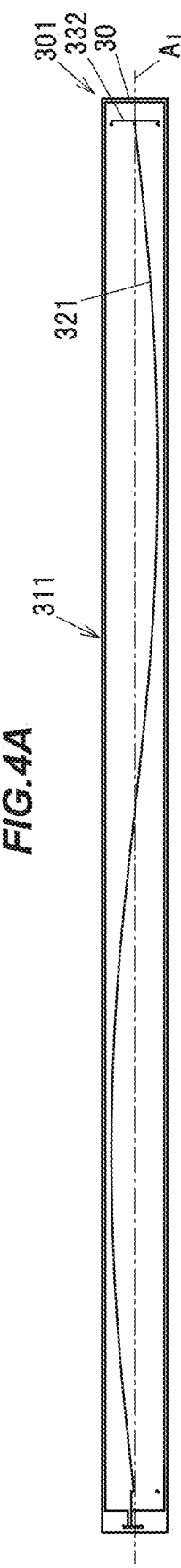
FIGS. 4A to 4D are plan views, respectively showing the first to fourth metal layers viewed from the front surface side.
Figure 4B:
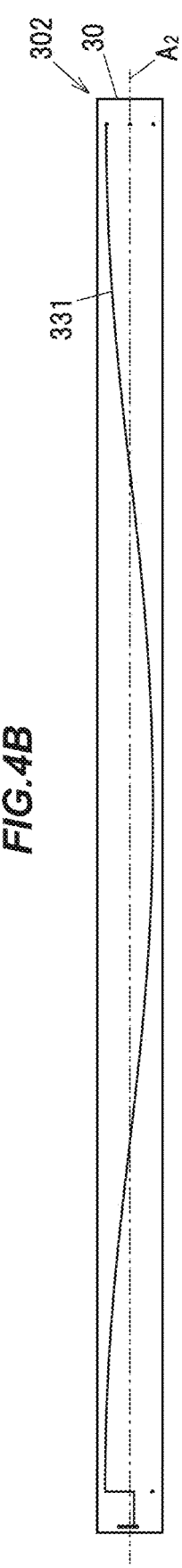
Figure 4C:
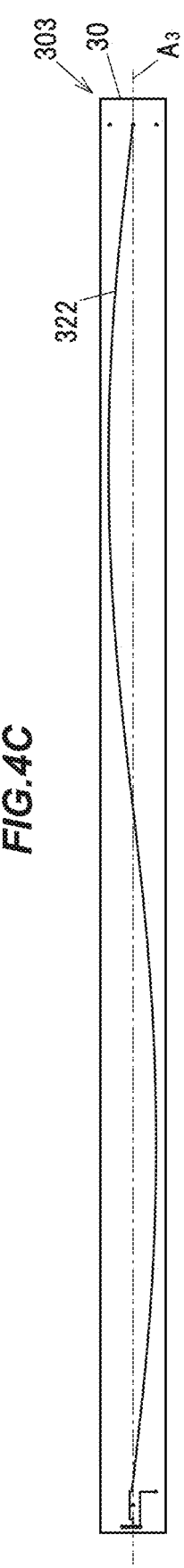
Figure 4D:
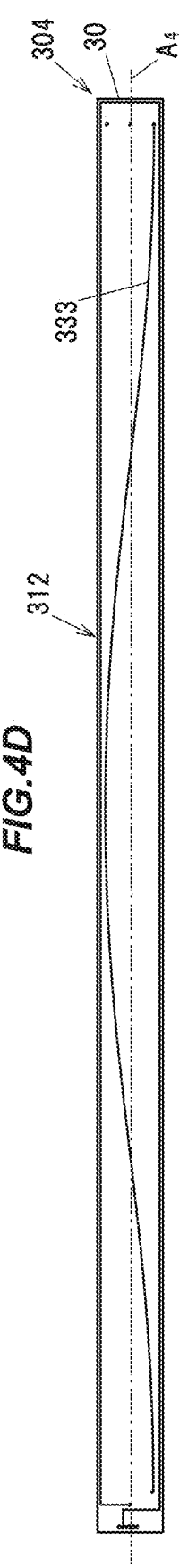

FIG. 3 is a plan view of the substrate 3 viewed from the front surface 3a-side. In FIG. 3, the wiring patterns formed on the first to fourth metal layers 301 to 304 are shown through perspective, in which the wiring pattern of the first metal layer 301 is indicated by solid lines, the wiring pattern of the second metal layer 302 is indicated by broken lines, the wiring pattern of the third metal layer 303 is indicated by a one-dot chain line, and the wiring pattern of the fourth metal layer 304 is indicated by a two-dot chain line. In FIG. 3, the position of the target 2 when the rack shaft 13 is positioned at one end and the other end of the range where the stroke sensor 1 can detect the absolute position of the rack shaft 13 is shown superimposed on the substrate 3. A longitudinal length $L_0$ of the substrate 3 is, e.g., 470 mm, and a shortitudinal width W of the substrate 3 is, e.g., 20 mm. A width $W_0$ of the target 2 in the direction parallel to the shortitudinal direction of the substrate 3 is equal to or wider than the shortitudinal width W of the substrate 3.

FIGS. 4A to 4D are plan views showing the first to fourth metal layers 301 to 304, respectively, viewed from the front surface 3*a*-side. FIGS. 5A to 5D are enlarged plan views showing the first to fourth metal layers 301 to 304 at both ends in the longitudinal direction of the substrate 3 as viewed from the front surface 3*a*-side. For convenience of explanation, one side in the longitudinal direction of the substrate 3 on the right side of FIGS. 4A to 4D and 5A to 5D is hereinafter referred to as "right", and the other side in the longitudinal direction of the substrate 3 on the left side of FIGS. 4A to 4D and 5A to 5D is referred to as "left". However, the "right" and "left" do not necessarily refer to the left side and right side in the width direction of the vehicle when mounted on the vehicle.

The substrate 3 is provided with first to fifth vias 341 to 345 for connecting the wiring patterns of the first to fourth metal layers 301 to 304, as shown in FIGS. 5A to 5D. In addition, a connector connecting portion 350 having first to sixth through-holes 351 to 356, through which connector pins 71 to 76 of a connector 7, shown in dotted lines in FIG. 5A, are inserted respectively, is provided at the left end of the substrate 3. The first to sixth through-holes 351 to 356 are aligned linearly along the shortitudinal direction of the substrate 3. The connector 7 is connected to a connector 81 (see FIG. 1A) of the cable 8 for connection to the power supply unit 4 and the calculation unit 5.

The substrate 3 includes an excitation coil 31 that generates an alternating magnetic field and two detection coils 32, 33 formed to be surrounded by the excitation coil 31. In other words, the excitation coil 31 and the detection coils 32, 33 are formed on a single substrate 3. The excitation coil 31 and the detection coils 32, 33 are formed in the longitudinal direction of the substrate 3 and are arranged along the axial direction of the rack shaft 13.

Induced voltage is generated in the detection coils 32 and 33 when the magnetic flux of the magnetic field generated by the excitation coil 31 is interlinked (i.e., chained together). When the target 2 is made of a material whose magnetic permeability is equal to or higher than that of the rack shaft 13, the magnetic flux concentrates and flows to the target 2, and the magnetic flux density in the portion of the substrate 3 facing the target 2 is higher than in other portions. When the target 2 is made of a material with electrical conductivity equal to or higher than that of the rack shaft 13, the eddy currents generated in the target 2 by the AC magnetic field cause the magnetic flux density interlinked to the detection coils 32 and 33 to be lower, and the magnetic flux density in the portion facing the target 2 on the substrate 3 becomes lower than that in other portions. Therefore, the magnitude of the voltage induced in the detection coils 32, 33 varies according to the position of the target 2 relative to the substrate 3. When a material with equal or higher magnetic permeability than the rack shaft 13 is used as the material of the target 2, it is desirable to use a magnetic material with high electrical resistance and low eddy current generation.

The phases of the voltages induced in the respective detection coils 32, 33 during the movement of the rack shaft 13 from one end of axial movement to the other end of axial movement are different from each other. In the present system, the phases of the voltages induced in the detection coils 32, 33 differ by 90°. Hereafter, one of the two detection coils 32 and 33 will be referred to as the sine wave-shaped detection coil 32 and the other detection coil 33 will be referred to as the cosine wave-shaped detection coil 33. The excitation coil 31, the sine wave-shaped detection coil 32, as well as the cosine wave-shaped detection coil 33 are distributed and formed in the first to fourth metal layers 301 to 304.

The magnitude of the voltages induced in the sine wave-shaped detection coil 32 and the cosine wave-shaped detection coil 33 varies within a range of one cycle or less while the rack shaft 13 moves from one end of axial movement to the other end of axial movement. This enables the stroke sensor 1 to detect the absolute position of the rack shaft 13 over the entire range DI over which the rack shaft 13 can move in the axial direction.

The sine wave-shaped detection coil 32 and the cosine wave-shaped detection coil 33 have a shape viewed from a direction perpendicular to the axial direction of the rack shaft 13, which is a combination of a pair of sine curve-shaped conductor lines. These pairs of sine curve-shaped conductor lines are symmetrical across the axis of symmetry $A_1$ to $A_4$ parallel to the axial direction of the rack shaft 13. In other words, if one of the pairs of sine curve-shaped conductor lines is inverted perpendicular to the axis of symmetry lines $A_1$ to $A_4$, the shape of the other conductor line is obtained. In FIGS. 4A to 4D, these symmetry axis lines $A_1$ to $A_4$ are shown as single dotted lines.

The sine wave-shaped detection coil 32 is composed of a corrugated (i.e., wave-shaped) conductor line 321 of the first metal layer 301, a corrugated conductor line 322 of the third metal layer 303, and a fourth via 344. The corrugated conductor lines 321 and 322 are sine curve-shaped (i.e., sinusoidal). The fourth via 344 connects right ends of the corrugated conductor lines 321, 322. A left end of the corrugated conductor line 321 of the first metal layer 301 is connected to the third through-hole 353 by the connecting conductor line 323 of the first metal layer 301. A left end of the corrugated conductor line 322 of the third metal layer 303 is connected to the fourth through-hole 354 by the connecting conductor line 324 of the third metal layer 303.

The cosine wave-shaped detection coil 33 is composed of a corrugated conductor line 331 of the second metal layer 302, a connecting conductor line 332 of the first metal layer 301, a corrugated conductor line 333 of the fourth metal layer 304, and third and fifth vias 343, 345. The corrugated conductor lines 331, 333 are sinusoidal. A right end of the corrugated conductor line 331 of the second metal layer 302 is connected to the third via 343. A right end of the corrugated conductor line 333 of the fourth metal layer 304 is connected to the fifth via 345. The connecting conductor line 332 of the first metal layer 301 is connected to the third via 343 and the fifth via 345. A left end of the corrugated conductor line 331 of the second metal layer 302 is connected to the fifth through-hole 355 by the connecting conductor line 334 of the second metal layer 302. A left end of the corrugated conductor line 333 of the fourth metal layer 304 is connected to the second via 342, and the second via 342 and the sixth through-hole 356 are connected by the connecting conductor line 335 of the third metal layer 303.

Thus, in the substrate 3, the corrugated conductor lines 321, 322, which are part of the sine wave-shaped detection coil 32, are formed in each of the first metal layer 301 and the third metal layer 303, and the corrugated conductor lines 331, 333 are formed. This means that, in comparison with the case where, for example, one detection coil is formed by the combination of the corrugated conductor lines formed in the first metal layer 301 and the second metal layer 302, respectively, and the other detection coil is formed by the combination of the corrugated conductor lines formed in the third metal layer 303 and the fourth metal layer 304, respectively, the difference in the average distance from the target 2 to the sine wave-shaped detection coil 32 and the cosine wave-shaped detection coil 33 is made smaller.

As shown in FIG. 3, the excitation coil 31 has a pair of long side portions 31a, 31b extending in the longitudinal direction of the substrate 3 and sandwiching the sine wave-shaped detection coil 32 and the cosine wave-shaped detection coil 33 in the shortitudinal direction of the substrate 3, and a pair of short side portions 31c, 31d extending in the shortitudinal direction of the substrate 3 to surround the sine wave-shaped detection coil 32 and the cosine wave-shaped detection coil 33.

In the present embodiment, the excitation coil 31 has a first excitation coil portion 311 formed in the first metal layer 301, and a second excitation coil portion 312 formed in the fourth metal layer 304. The first excitation coil portion 311 has a beginning edge connected to the first through-hole 351 and a terminal edge connected to the first via 341. The second excitation coil portion 312 has a beginning edge connected to the first via 341 and a terminal edge connected to the second through-hole 352.

The first excitation coil portion 311 has a longitudinal conductor line 311a extending along one shortitudinal end 3c of the substrate 3, a shortitudinal conductor line 311b extending along a right edge 3d of the substrate 3, a longitudinal conductor line 311c extending along the other shortitudinal end 3e of the substrate 3, and shortitudinal conductor lines 311d and 311e extending along a left edge 3f of the substrate 3. The shortitudinal conductor line 311d and the first through-hole 351 are connected by a connection line 311f. The shortitudinal conductor line 311e is connected to the first via 341.

The second excitation coil portion 312 has a longitudinal conductor line 312a extending along one shortitudinal end 3c of the substrate 3, a shortitudinal conductor line 312b extending along the right edge 3d of the substrate 3, a longitudinal conductor line 312c extending along the other shortitudinal end 3e of the substrate 3, and shortitudinal conductor lines 312d and 312e extending along the left edge 3f of the substrate 3. The shortitudinal conductor line 312d and the second through-hole 352 are connected by a connection line 312f. The shortitudinal conductor line 312d is connected to the first via 341.

Of the pair of long side portions 31a and 31b of the excitation coil 31, one long side portion 31a is composed of the longitudinal conductor line 311a of the first excitation coil portion 311 and the longitudinal conductor line 312a of the second excitation coil portion 312. The other long side portion 31b is composed of the longitudinal conductor line 311c of the first excitation coil portion 311 and the longitudinal conductor line 312c of the second excitation coil portion 312.

Of the pair of short side portions 31c, 31d of the excitation coil 31, one short side portion 31c is composed of the shortitudinal conductor line 311b of the first excitation coil portion 311 and the shortitudinal conductor line 312b of the second excitation coil portion 312. The other short side portion 31d is composed of the shortitudinal conductor lines 311d, 311e of the first excitation coil portion 311 and the shortitudinal conductor lines 312d, 312e of the second excitation coil portion 312.

Between each of the pair of short side portions 31c, 31d of the excitation coil 31 and the sine wave-shaped detection coil 32 and the cosine wave-shaped detection coil 33, buffer regions $E_1$, $E_2$ are provided to suppress the voltage generated in the sine wave-shaped detection coil 32 and the cosine wave-shaped detection coil 33 by the magnetic field generated by the current flowing through the pair of short side portions 31c, 31d. This enhances the detection accuracy of the position by the stroke sensor 1. In the present embodiment, a width $W_1$ of the buffer region Ej on the left side and a width $W_2$ of the buffer region $E_2$ on the right side in the longitudinal direction of the substrate 3 are the same, but the widths $W_1$ and $W_2$ may not be the same.

As shown in FIG. 5, the connecting conductor line 323 of the first metal layer 301, the connecting conductor line 334 of the second metal layer 302, and the connecting conductor lines 324, 335 of the third metal layer 303 extend linearly along the longitudinal direction of the substrate 3 in the buffer region $E_1$. The third through-hole 353 and the fourth through-hole 354, which are output ends of the sine wave-shaped detection coil 32, are adjacent to each other, and the fifth through-hole 355 and the sixth through-hole 356, which are output ends of the cosine wave-shaped detection coil 33, are adjacent to each other. This suppresses fluctuations in the output voltage of the sine wave-shaped detection coil 32 due to magnetic fluxes interlinked (i.e., chained) in the portion between the connecting conductor line 323 of the first metal layer 301 and the connecting conductor line 324 of the third metal layer 303. The output voltage fluctuation of the cosine wave-shaped detection coil 33 is also suppressed by the magnetic flux interlinked (i.e., chained) to the portion between the connecting conductor line 334 of the second metal layer 302 and the connecting conductor line 335 of the third metal layer 303.

As shown in FIG. 3, if the lengths of the sine wave-shaped detection coil 32 and the cosine wave-shaped detection coil 33 in the longitudinal direction of the substrate 3 is $L_2$ and the length of the target 2 in the same direction is $L_3$, the longer the length of the target 2 $L_3$ is, the larger the change in output voltage of the sine wave-shaped detection coil 32 and the cosine wave-shaped detection coil 33, so that the position detection accuracy will be increased. However, the stroke sensor 1 can accurately detect the position of the target 2 and the rack shaft 13 in the range where the entire length $L_3$ of the target 2 is included in the length $L_2$ of the sine wave-shaped detection coil 32 and the cosine wave-shaped detection coil 33. Therefore, the longer the length $L_3$ of the target 2 is, the narrower the detectable range of the stroke sensor 1 becomes. In other words, the detectable range of the stroke sensor 1 is the length range of ($L_2$-$L_3$). Therefore, the length $L_3$ of the target 2 should be half or less of the length $L_2$ of the sine wave-shaped detection coil 32 and the cosine wave-shaped detection coil 33, and the more desirable range of the length $L_3$ of target 2 to the length $L_2$ of the sine wave-shaped detection coil 32 and the cosine wave-shaped detection coil 33 is 1% or more and 50% or less.

As shown in FIG. 3, if a length of the excitation coil 31 in the longitudinal direction of the substrate 3 is $L_1$, a width of the excitation coil 31 in the shortitudinal direction of the substrate 3 is $W_E$, and the widths of the sine wave-shaped detection coil 32 and the cosine wave-shaped detection coil 33 in the shortitudinal direction of the substrate 3 are $W_D$, the widths $W_1$, $W_2$ of the buffer regions $E_1$, $E_2$ is desirably $(W_D/W_E) \times L_2 \times 0.004$ or more.

(Operation of Stroke Sensor 1)

Next, the operation of the stroke sensor 1 for detecting the position of the target 2 with respect to the substrate 3 will be described with reference to FIGS. 6 to 8. Here, the axial direction of the rack shaft 13 is the X-axis, and the X-coordinates of the position of the left end in the range of the length $L_1$ of the excitation coil 31 in the longitudinal direction of the substrate 3 are 0 and those of the right end are 1. The position of the target 2 is represented by the X coordinate of the center in the longitudinal direction of the target 2.

Figure 6:
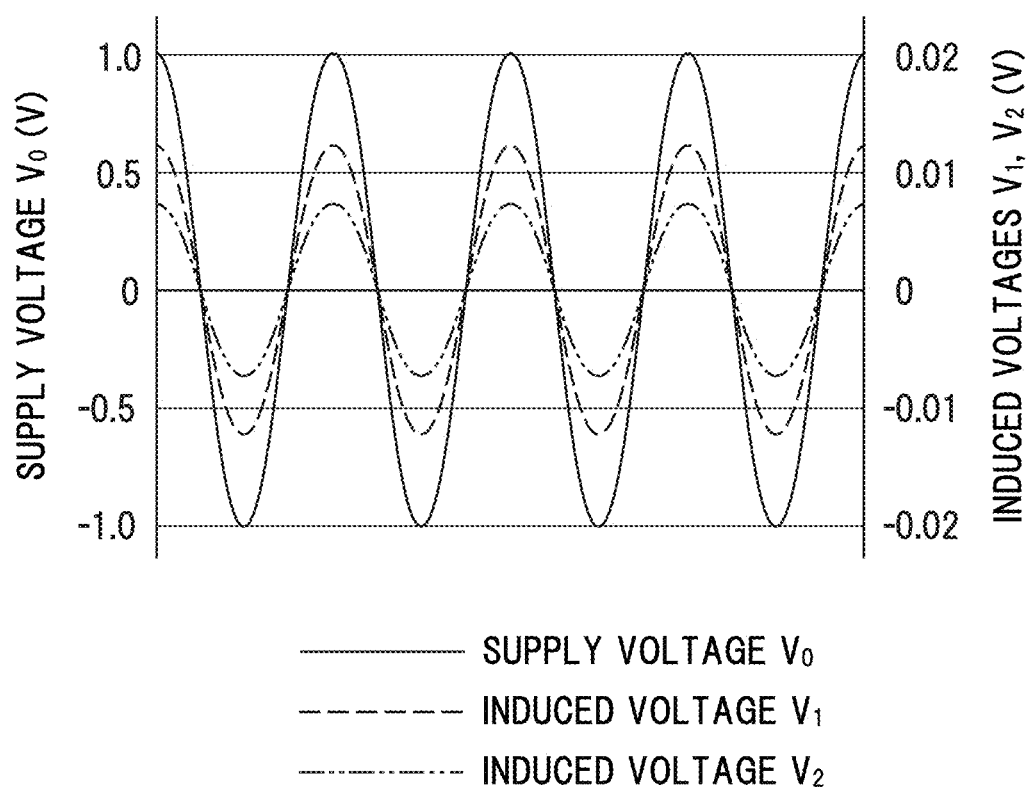
FIG. 6 is a graph showing the relationship between a supply voltage supplied from a power supply unit to an excitation coil, an induced voltage induced in a sine wave-shaped detection coil, and an induced voltage induced in a cosine wave-shaped detection coil.

FIG. 6 is a graph showing an example of the relationship between the supply voltage $V_0$ supplied from the power supply unit 4 to the excitation coil 31, the induced voltage $V_1$ induced in the sine wave-shaped detection coil 32, and the induced voltage $V_2$ induced in the cosine wave-shaped detection coil 33 when the X coordinate of the target 2 is 0.18. The horizontal axis of the graph in FIG. 6 is the time axis, and the left and right vertical axes indicate the supply voltage $V_0$ and the induced voltages $V_1$ and $V_2$. The induced voltage $V_1$ is the output voltage of the sine wave-shaped detection coil 32 and the induced voltage $V_2$ is the output voltage of the cosine wave-shaped detection coil 33.

In the example shown in FIG. 6, the supply voltage $V_0$ supplied to the excitation coil 31 and the induced voltages $V_1$ and $V_2$ induced in the sine wave-shaped detection coil 32 and the cosine wave-shaped detection coil 33 are in phase. However, when the X coordinate of the target 2 exceeds 0.5, the induced voltage $V_1$ induced in the sine wave-shaped detection coil 32 is in the opposite phase to the supply voltage $V_0$ supplied to the excitation coil 31. The induced voltage $V_2$ induced in the cosine wave-shaped detection coil 33 switches between the same phase and the opposite phase each time the target 2 passes through the position where the corrugated conductor line 331 of the second metal layer 302 and the corrugated conductor line 333 of the fourth metal layer 304 are crossing. A high-frequency AC voltage of, e.g., about 1 MHz to 1 GHz is supplied to the excitation coil 31 as the supply voltage $V_0$.

Figure 7:
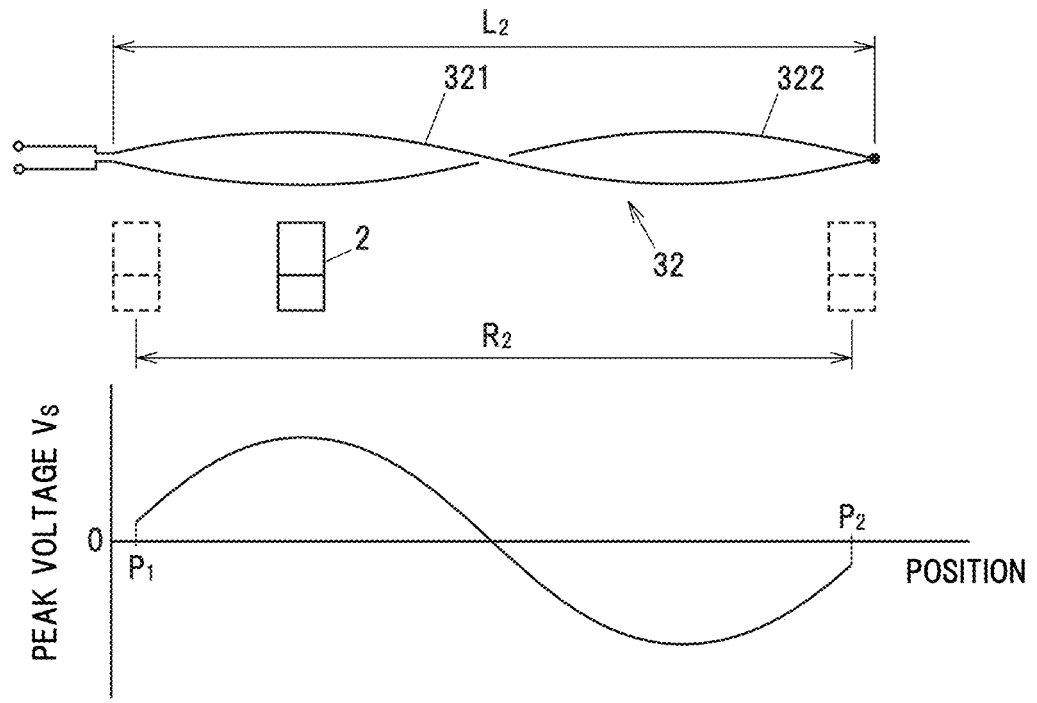
FIG. 7 is an explanatory diagram schematically showing the relationship between a peak voltage, which is a peak value of the induced voltage induced in the sine wave-shaped detection coil, and the position of the target.
Figure 8:
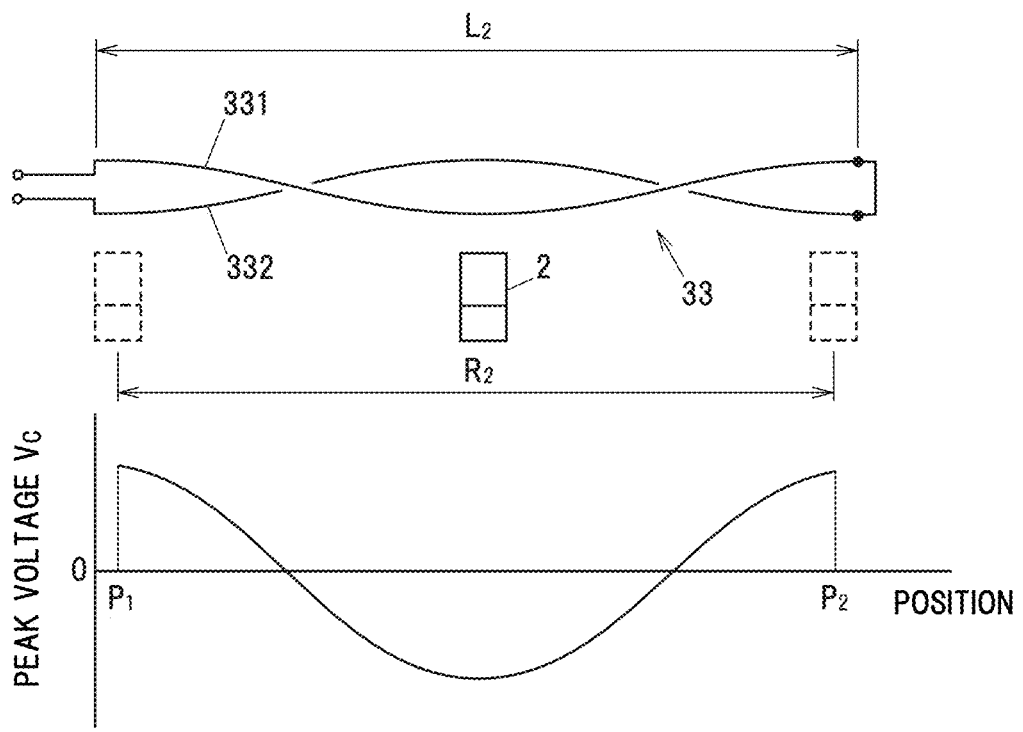
FIG. 8 is an explanatory diagram schematically showing the relationship between a peak voltage, which is a peak value of the induced voltage induced in the cosine wave-shaped detection coil, and the position of the target.

FIG. 7 is an explanatory diagram schematically showing the relationship between the peak voltage $V_S$, which is the peak value of the induced voltage $V_1$ induced in the sine wave-shaped detection coil 32, and the position of the target 2. FIG. 8 is an explanatory diagram schematically showing the relationship between the peak voltage $V_C$, which is the peak value of the induced voltage $V_2$ induced in the cosine wave-shaped detection coil 33, and the position of the target 2.

The stroke sensor 1 can detect an absolute position of the target 2 within an axial range $R_2$ in which the length $L_3$ of the target 2 is subtracted from the length $L_2$ of the sine wave-shaped detection coil 32 and the cosine wave-shaped detection coil 33 in the longitudinal direction of the substrate 3. In the graphs shown in FIGS. 7 and 8, the X coordinate when the target 2 is at the left end of the axial range $R_2$ is $P_1$ and the X coordinate when the target 2 is at the right end of the axial range $R_2$ is $P_2$, the peak voltages $V_S$ and $V_C$ at each position are shown. The peak voltage $V_S$ of the sine wave-shaped detection coil 32 is positive when the induced voltage $V_1$ induced in the sine wave-shaped detection coil 32 is in phase with the voltage $V_0$ supplied to the excitation coil 31, and negative when it is in opposite phase. Similarly, the peak voltage $V_C$ of the cosine wave-shaped detection coil 33 is positive when the induced voltage $V_2$ induced in the cosine wave-shaped detection coil 33 is in phase with the voltage $V_0$ supplied to the excitation coil 31, and negative when it is in the opposite phase.

Here, if ωx is defined as in Formula [1], the peak voltages $V_S$ and $V_C$ are obtained by Formula [2] and Formula [3], where Xp is the X coordinate of the target 2. Note that A in Formula [2] and Formula [3] is a predetermined constant.

[Formula 1]
$$\omega_x = \frac{2\pi}{L_2} \quad [1]$$

[Formula 2]
$$V_s = A\sin\{\omega_x(X_p - W_1)\} \quad [2]$$

[Formula 3]
$$V_c = A\cos\{\omega_x(X_p - W_1)\} \quad [3]$$

From Formula [2] and Formula [3], the X coordinate Xp of the target 2 can be obtained by Formula [4]. In other words, the calculation unit 5 can calculate the X coordinate of the target 2 relative to the substrate 3 based on the peak voltages $V_S$ and $V_C$.

[Formula 4]
$$X_p = \frac{\arctan\left(\frac{V_s}{V_c}\right)}{\omega_x} + W_1 \quad [4]$$

(Sensor 9)

The stroke sensor 1 in the present embodiment includes a sensor 9 that detects a physical quantity used to correct the position of the rack shaft 13 using a sensor coil 91 (i.e., coil for sensor) consisting of the excitation coil 31, the detection coils 32 and 33, or other coils on the substrate 3.

In the present embodiment, a distance sensor that measures a distance between the substrate 3 and the rack shaft 13 is mounted as the sensor 9. By using the distance sensor as the sensor 9, it is possible to estimate the eccentricity or deflection of the rack shaft 13. For example, if there is no eccentricity in the rack shaft 13 (i.e., if eccentricity is negligible), the degree of deflection (i.e., the magnitude of deflection stress) can be detected. If there is no deflection in the rack shaft 13 (i.e., the deflection is negligible), the degree of eccentricity can be estimated. Then, by correcting the detected position according to the degree of eccentricity or deflection, it is possible to improve the position detection accuracy and robustness.

Figure 9A:
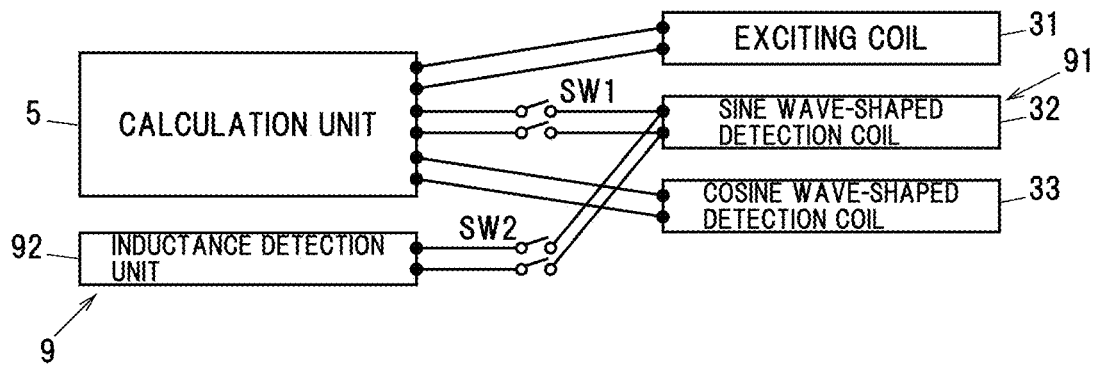
FIG. 9A is an explanatory diagram of a sensor in the first example.

When the sensor 9 is used as a distance sensor, the sensor coil 91 must be installed to face the rack shaft 13. When the distance between the sensor coil 91 and the rack shaft 13 changes, the mutual inductance between the sensor coil 91 and the rack shaft 13 changes. Therefore, as shown in FIG. 9A, by further providing an inductance detection unit 92 that detects the inductance at the sensor coil 91, the change in inductance (change in mutual inductance) of the sensor coil 91 can be used to detect the change in distance between the substrate 3 (sensor coil 91) and the shaft 13 due to eccentricity or deflection.

In the present embodiment, the sine wave-shaped detection coil 32 is used as the sensor coil 91. In this case, as shown in FIG. 9A, switches SW1 and SW2 can be provided to switch between connecting the sine wave-shaped detection coil 32 to the calculation unit 5, which performs the position detection of the rack shaft 13, or to the inductance detection unit 92. Then, by switching the switches SW1 and SW2, the position detection of the rack shaft 13 and the detection of the inductance of the sine wave-shaped detection coil 32 may be configured to alternate at predetermined time intervals. In the example of FIG. 9A, the position detection of the rack shaft 13 can be performed by turning on the switch SW1 between the sine wave-shaped detection coil 32 and the calculation unit 5 and turning off the switch SW2 between the sine wave-shaped detection coil 32 and the inductance detection unit 92. The inductance of the sine wave-shaped detection coil 32 can be detected by turning off the switch SW1 and turning on the switch SW2. As the switches SW1 and SW2, for example, semiconductor switches mounted on the substrate 3 can be used.

Figure 9B:
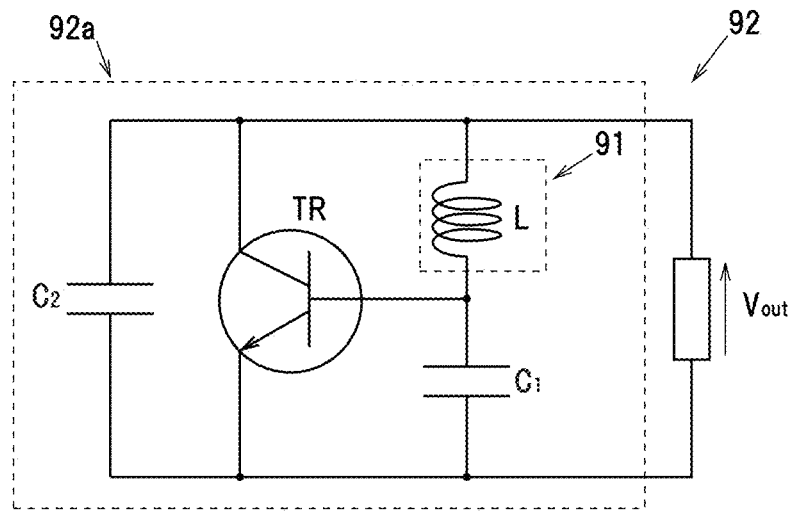
FIG. 9B is a circuit diagram of an example of an inductance detection unit.
Figure 9C:
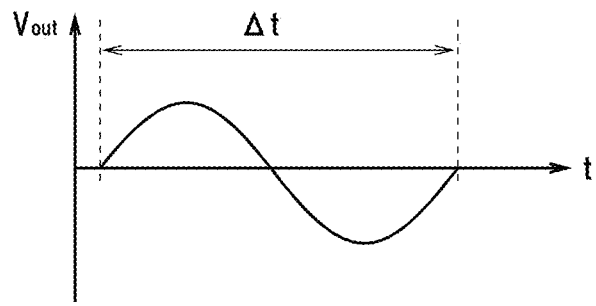
FIG. 9C is a graph showing an output voltage V in FIG. 9B.

FIG. 9B is a circuit diagram of an example of an inductance detection unit. In FIG. 9B, the inductance L is the sum of the inductance of the sensor coil 91 (here, the sine wave-shaped detection coil 32) per se and the mutual inductance between the sensor coil 91 and the rack shaft 13. As shown in FIG. 9B, a Corbitz-type LC oscillation circuit 92a using, for example, two capacitance elements C1, C2, a transistor TR, and the sensor coil 91 can be used as the inductance detection unit 92. The output voltage $V_{out}$ of this LC oscillation circuit 92a has the waveform shown in FIG. 9C. Here, the resonance frequency fr of the LC oscillation circuit 92a is obtained by the following Formula [5].

[Formula 5]

$$f_r = \frac{1}{\Delta t} = \frac{1}{2\pi}\left(L\frac{C_1 C_2}{C_1 + C_2}\right)^{-\frac{1}{2}} \quad [5]$$

By obtaining the resonance frequency fr using Formula [5], the inductance L can be detected, and from the change in inductance L, the change in distance between the substrate 3 (sensor coil 91) and the rack shaft 13 due to eccentricity or deflection can be detected.

The specific structure of the distance sensor as sensor 9 is not limited to this. For example, when the distance between the substrate 3 (sensor coil 91) and the rack shaft 13 changes, the electromotive force induced in the sensor coil 91 changes. Therefore, it is also possible to configure the system to detect changes in the distance between the substrate 3 (sensor coil 91) and the rack shaft 13 from changes in the electromotive force.

In the present embodiment, the sine wave-shaped detection coil 32 is used as the sensor coil 91, but it is not limited to this. The excitation coil 31 and the cosine wave-shaped detection coil 33 may also be used as the sensor coil 91, or a dedicated coil may be provided on the substrate 3 separately from these coils 31 to 33. When a dedicated coil is provided, for example, coils may be provided on both the left and right sides of the detection coils 32 and 33 respectively, and the coil may be configured to detect changes in the distances from the rack shaft 13 at two locations.

The value of inductance L detected by the sensor 9 is output to the calculation unit 5, where the detection position is corrected according to the change in inductance L detected by the sensor 9 (i.e., the change in distance between the substrate 3 and the rack shaft 13 due to eccentricity or deflection). This makes it possible to detect the position of the rack shaft 13 with greater accuracy.

(Other Examples of the Sensor 9)

The case where the sensor 9 is a distance sensor is described in the present embodiment, but the invention is not limited thereto, and other sensors may be used. For example, a temperature sensor that detects the temperature of the substrate 3 may be used as the sensor 9, since a change in the temperature of the substrate 3 may cause an error in the detection position due to thermal expansion of the substrate 3.

Figure 10:
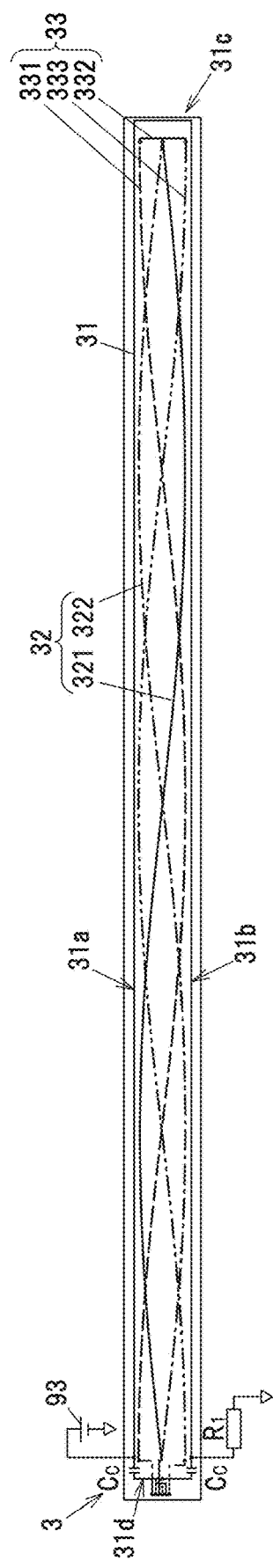
FIG. 10 is an explanatory diagram of a sensor in the second example.

When the sensor 9 is used as a temperature sensor, for example, as shown in FIG. 10, the resistance of the sensor coil 91 may be detected by connecting a DC power 93 and an output resistance $R_1$ to the sensor coil 91, and measuring the voltage at both ends of output resistance $R_1$. FIG. 10 shows a case in which the excitation coil 31 is used as the sensor coil 91, but the detection coils 32, 33 may be used as the sensor coil 91, or a dedicated coil may be used. When the excitation coil 31 or the detection coils 32 and 33 are used as the sensor coil 91, a DC cut capacitor Cc may be provided so that DC current does not flow to the calculation unit 5-side.

In the example in FIG. 10, the calculation unit 5 receives the voltage at both ends of the output resistance $R_1$ and corrects the detection position according to this voltage (i.e., according to the temperature of the substrate 3). Since the temperature of the housing 14 is also considered to be equivalent to that of the substrate 3, the correction may be configured to also take into account the thermal expansion of the housing 14, etc.

As another example, when the temperature of the target 2 changes, the impedance and permeability of the target 2 changes, and the magnetic flux density in the part of the target 2 may change, causing an error in the detection position. Therefore, as the sensor 9, a detection object temperature sensor that determines the temperature of target 2 can be used.

Figure 11A:
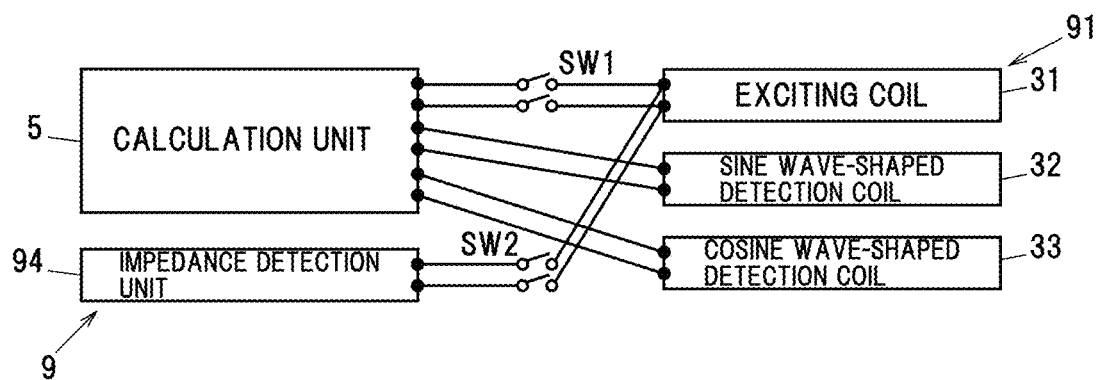
FIG. 11A is an explanatory diagram of the sensor in the second example.

When the sensor 9 is used as a detection object temperature sensor, as shown in FIG. 11A, the sensor 9 may be further equipped with an impedance detection unit 94 for determining the impedance of the sensor coil 91, and configured to determine the temperature of the target 2 from the impedance of the sensor coil 91.

FIG. 11A shows the case where the sensor coil 91 is the excitation coil 31. As shown in FIG. 11A, when the excitation coil 31 is used as the sensor coil 91, the switches SW1 and SW2 can be provided to switch whether the excitation coil 31 is connected to the calculation unit 5 for position detection of the rack shaft 13 or the impedance detection unit 94. By switching the switches SW1 and SW2, the position detection of the rack shaft 13 and the impedance detection of the excitation coil 31 can be configured to alternate at predetermined time intervals.

Figure 11B:
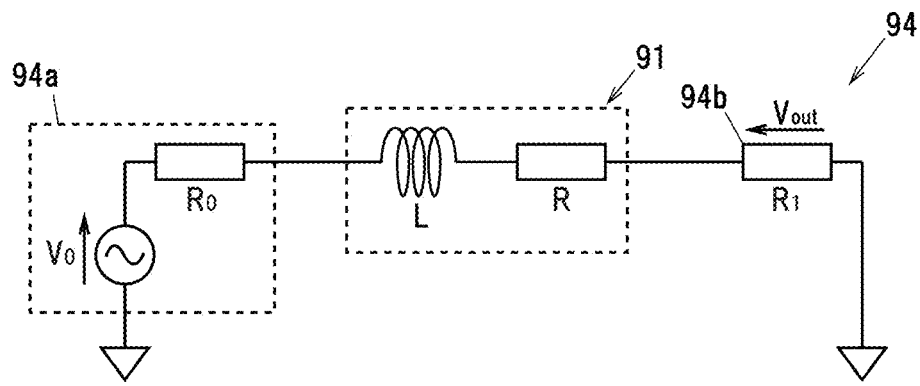
FIG. 11B is a circuit diagram of an example of an impedance detection unit.

FIG. 11B shows an example of the impedance detection unit 94. In FIG. 11B, the inductance L is the sum of the inductance of the sensor coil 91 (in this case, the excitation coil 31), the inductance of the target 2, and the mutual inductance of the two. The resistance R is the sum of the resistance of the sensor coil 91 and the resistance of the target 2. As shown in FIG. 11B, the impedance detection unit 94 has a voltage source 94a that supplies an AC reference voltage $V_0$ to the sensor coil 91 and an output resistance $R_1$ for measuring the output voltage $V_{out}$. The resistance $R_0$ is an internal resistance of the voltage source 94a, and the output resistance $R_1$ is an internal resistance of an AD converter, for example.

Figure 11C:
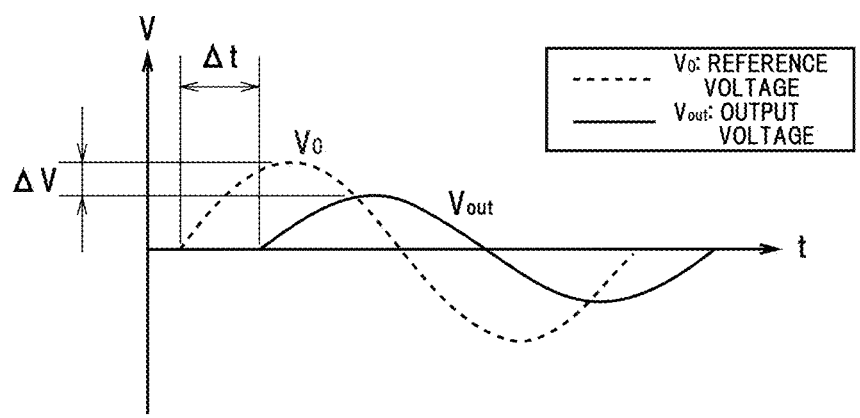
FIG. 11C is a graph showing a reference voltage and an output voltage in FIG. 11B.

FIG. 11C is a graph showing the reference voltage $V_0$ and the output voltage $V_{out}$ in the impedance detection unit 94. As shown in FIG. 11C, the output voltage $V_{out}$ is delayed by $\Delta t$ relative to the reference voltage $V_0$ and the amplitude is reduced by $2 \times \Delta V$. Using this $\Delta t$ and $\Delta V$, the impedance can be detected and the resistance R can be detected. This resistance R is the sum of the resistance of the sensor coil 91 and the resistance of the target 2, as described above, and since the resistance of the target 2 varies according to the temperature of the target 2, the temperature of the target 2 can be detected by detecting the impedance (resistance R) of the sensor coil 91.

In the example of FIGS. 11A to 11C, the calculation unit 5 receives the output voltage $V_{out}$ (or the value of resistance R) and correct the detection position accordingly. As in FIG. 10, there may be a separate means of measuring the resistance of the sensor coil 91. This makes it possible to extract only the resistance of the target 2 in the resistance R, which makes it possible to improve the detection accuracy of the temperature of the target 2 and, consequently, the detection accuracy of the position of the rack shaft 13.

Although the case where the sensor coil 91 is the excitation coil 31 is described here, the detection coils 32, 33 or a dedicated coil formed separately from the excitation coil 31 or the detection coils 32, 33 may be used as the sensor coil 91. However, since the impedance of the detection coils 32 and 33 may change due to the position of the target 2, it is desirable to use the excitation coil 31 or a dedicated coil as the sensor coil 91.

Figure 12:
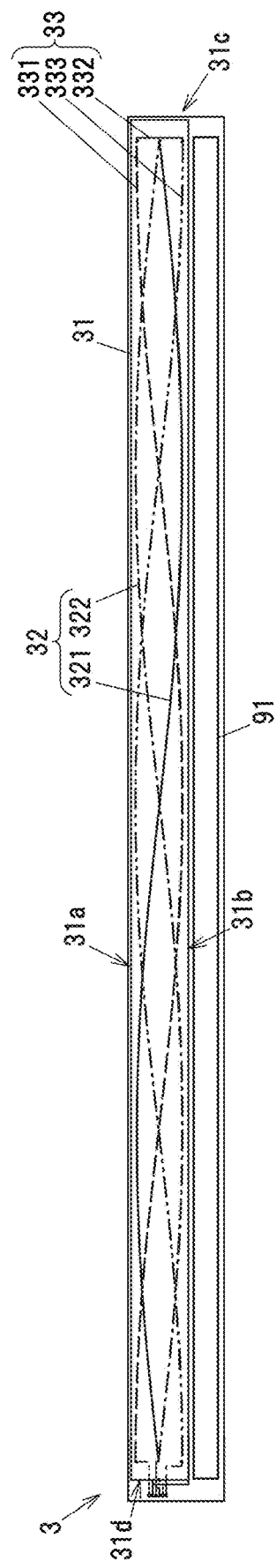
FIG. 12 is an explanatory diagram of a sensor in the third example.

When the sensor coil 91 is provided separately from the excitation coil 31 and the detection coils 32, 33, for example, as shown in FIG. 12, it is recommended to form a rectangular-shaped sensor coil 91 in line with the detection coils 32, 33 (perpendicular to the extending direction of the excitation coil 31), so as to span the entire moving range of the target 2.

Furthermore, as shown in FIG. 13, multiple sets (two sets in the illustrated example) of detection coils 32, 33 are arranged in a direction perpendicular to the extending direction of the excitation coil 31, and multiple targets 2 are provided at different positions in the moving direction of the rack shaft 13 corresponding to the multiple sets of detection coils 32, 33, respectively, and the detection coils 32, 33 may have their respective detectable ranges offset in the moving direction of the rack shaft 13. In this case, any one of the multiple sets of detection coils 32, 33 (the set of detection coils 32, 33 facing the target 2) will be used to detect the position of the rack shaft 13. This allows the substrate 3 to be shortened and the stroke sensor 1 to be downsized. In this case, the detection coils 32, 33 not used for position detection (e.g., the detection coils 32, 33 on the side not facing the target 2) can be used as the sensor coils 91 and connected to the inductance detection unit 92 and impedance detection unit 94 described above to measure various physical quantities.

In addition to the above, a sensor that does not use the sensor coil 91 may be integrally mounted on the substrate 3. For example, a vibration sensor may be integrated into the substrate 3 and configured to acquire road surface conditions, etc. with the vibration sensor.

The initial angle of the steering angle sensor 18 may be estimated according to the detected position of the stroke sensor 1. This eliminates the need for an initial angle investigation system for the steering angle sensor 18 and allows for lower cost for the steering device 10 as a whole.

In addition, the position detection of the rack shaft 13 may be made redundant by enabling the position detection of the rack shaft 13 with both the stroke sensor 1 and the rotation angle sensor (resolver) installed in the electric motor 16, thereby improving safety.

Functions and Effects of the Embodiment

As explained above, the stroke sensor 1 according to the present embodiment 1 has the sensor 9 that detects a physical quantity used to correct the position of the rack shaft 13 by using the sensor coil 91 composed of the excitation coil 31, the detection coils 32 and 33, or other coils on the substrate 3.

This makes it possible to use physical quantities detected by the sensor 9 (e.g., distance between the substrate 3 and the rack shaft 13, temperature of the substrate 3, temperature of the target 2, etc.) to correct the detected position, enabling highly accurate detection of the position of a shaft moving forward and backward in the axial direction. In addition, compared to the case where the sensor 9 is installed separately from the substrate 3, the installation work is easier and the stroke sensor 1 as a whole, including the sensor 9, can be made smaller.

Summary of Embodiment

Next, the technical concepts that can be grasped from the above described embodiment will be described with the help of the signs, etc. in the embodiment. However, each sign, etc. in the following description is not limited to the members, etc. specifically shown in the embodiment for the components in the scope of claims.

According to the first feature, a position detection device (stroke sensor) 1 for detecting a position of a shaft (rack shaft) 13 that moves forward and backward in an axial direction includes a detection object (target) 2 mounted on the shaft 13, a substrate 3 disposed to face the detection object 2, an excitation coil 31 that is mounted on the substrate 3 and generates an AC magnetic field, a detection coil 32, 33 that is mounted on the substrate 3 and arranged along the axial direction of the shaft 13 and configured so that a magnitude of a voltage induced varies with a position of the detection object 2, and a sensor 9 for detecting a physical quantity used to correct the position of the shaft 13 by using a sensor coil 91 configured by the excitation coil 31, the detection coil 32, 33, or an other coil provided on the substrate 3.

According to the second feature, in the position detection device 1 as described by the first feature, the sensor 9 is a distance sensor that has an inductance detection unit 92 for determining an inductance of the sensor coil 91 and detects a change in a distance between the substrate 3 and the shaft 13 from a change in the inductance of the sensor coil 91.

According to the third feature, in the position detection device 1, as described by the first feature, the sensor 9 is a temperature sensor that detects a resistance of the sensor coil 91 and determines a temperature of the substrate 3 from the resistance of the sensor coil 91.

According to the fourth feature, in the position detection device 1, as described by the first feature, the sensor 9 is a detection object temperature sensor that has an impedance detection unit 94 for determining an impedance of the sensor coil 91 and determines a temperature of the detection object 2 from the impedance of the sensor coil 91.

According to the fifth feature, in the position detection device 1, as described by any one of the first to fourth features, further includes a calculation unit 5 that calculates the position of the shaft 13 based on the voltage induced in the detection coil 32, 33, and corrects the position of the shaft 13 obtained by the calculation according to the physical quantity detected by the sensor 9.

According to the sixth feature, in the position detection device 1, as described by any one of the first to fifth features, multiple sets of the detection coils 32, 33 are provided side by side in a direction perpendicular to an extending direction of the excitation coil 31, a plurality of the detection objects 2 are provided at different positions in a moving direction of the shaft 13 corresponding to each of the multiple sets of detection coils 32, 33, and a detectable range of each of the multiple sets of detection coils 32, 33 is offset in the moving direction of the shaft 13, and the position detection device 1 is configured to detect the position of the shaft 13 using any of the multiple sets of the detection coils 32, 33 and to use the detection coil 32, 33 that is not used to detect the position of the shaft 13 as the sensor coil 91.

The above description of the embodiment of the invention does not limit the invention as claimed above. It should also be noted that not all of the combinations of features described in the embodiment are essential to the means for solving the problems of the invention. In addition, the invention can be implemented with appropriate modifications to the extent that it does not depart from the gist of the invention.

The invention claimed is:

1. A position detection device for detecting a position of a shaft moving forward and backward in an axial direction, comprising:
    a detection object mounted on the shaft;
    a substrate disposed to face the detection object;
    an excitation coil that is mounted on the substrate and generates an AC magnetic field;
    a detection coil that is mounted on the substrate and arranged along the axial direction of the shaft and configured so that a magnitude of a voltage induced varies with a position of the detection object; and
    a sensor for detecting a physical quantity used to correct the position of the shaft by using a sensor coil configured by the excitation coil, the detection coil, or an other coil provided on the substrate.

2. The position detection device, according to claim 1, wherein the sensor is a distance sensor that has an inductance detection unit for determining an inductance of the sensor coil and detects a change in a distance between the substrate and the shaft from a change in the inductance of the sensor coil.

3. The position detection device, according to claim 1, wherein the sensor is a temperature sensor that detects a resistance of the sensor coil and determines a temperature of the substrate from the resistance of the sensor coil.

4. The position detection device, according to claim 1, wherein the sensor is a detection object temperature sensor that has an impedance detection unit for determining an impedance of the sensor coil and determines a temperature of the detection object from the impedance of the sensor coil.

5. The position detection device, according to claim 1, further comprising:
    a calculation unit that calculates the position of the shaft based on the voltage induced in the detection coil and corrects the position of the shaft obtained by the calculation according to the physical quantity detected by the sensor.

6. The position detection device, according to claim 1, wherein the detection coil comprises multiple sets of detection coils provided side by side in a direction perpendicular to an extending direction of the excitation coil,
    wherein the detection object comprises a plurality of detection objects provided at different positions in a moving direction of the shaft corresponding to each of the multiple sets of detection coils,
    wherein a detectable range of each of the multiple sets of detection coils is offset in the moving direction of the shaft,
    wherein the position detection device is configured to detect the position of the shaft using any of the multiple sets of the detection coils, and to use the detection coil that is not used to detect the position of the shaft as the sensor coil.

* * * * *